United States Patent Office 3,824,107
Patented July 16, 1974

3,824,107
MORTAR COMPOSITIONS CONTAINING MIXTURES OF HYDROXYALKYL CELLULOSES
David S. Weiant, Moorestown, N.J., assignor to AA Quality Construction Material, Inc., Morrestown, N.J.
No Drawing. Filed Jan. 28, 1972, Ser. No. 221,772
Int. Cl. C04b 7/02
U.S. Cl. 106—93                                8 Claims

ABSTRACT OF THE DISCLOSURE

Improved aqueous mortar compositions contain a minor amount of a mixture of (1) hydroxypropyl cellulose and (2) hydroxymethyl cellulose or hydroxyethyl cellulose or mixtures thereof. Compositions in accordance with the present invention can be formulated to effect quick solution and produce a stable viscosity through time and temperature conditions of use.

BACKGROUND OF THE INVENTION

Field of the Invention

The present invention relates to hydraulic cement mortar compositions particularly adapted for use in grouting and setting tile. Other uses would be for stucco, plaster, dry adhesives, cement patch compounds, drilling muds, and the like.

DESCRIPTION OF THE PRIOR ART

Conventional cement mortars, containing Portland cement, sand and water added in an amount to obtain the necessary workability and to effect gel formulation during curing have good bonding properties, non-flammability, resistance to attack by rodents, insects, and fungi, and other desirable properties. They also have the known disadvantage, however, that for tile setting purposes relatively thick layers are required with consequent excessive labor entailed in mixing, placing, and troweling to produce such thick layers.

The addition of from .25% to 2.2% of methyl cellulose for the purpose of forming a mixture which can be applied in a relatively thin layer has been suggested in U.S. Pat. 2,820,713. Hydroxyethyl cellulose in concentrations of from .6% to 2.0% as suggested in U.S. Pat. 3,243,307 has been used because it has better water retentive properties than mortars containing methyl cellulose. U.S. Pat. 3,030,258 discloses Portland cement, methyl cellulose, and polyvinyl alcohol. U.S. Pat. 3,486,960 discloses hydraulic cement and dextrine. All are classed as water retentive additives.

Disadvantages of the above examples of water-retentive additives of the prior art include one or more of the following:
(1) The high cost of the additive.
(2) Difficulties encountered in the control of retentativity due to very poor solubility rates.
(3) Problems experienced in the control of the physical characteristics of the mortar due to varying solubility of the additive over the period of use.
(4) Changes in viscosity of the mortar due to temperature variations at time of use which also cause working difficulties in the mortar.

SUMMARY OF THE INVENTION

The present invention relates to dry mortar-forming compositions containing a minor amount of a mixture of (1) hydroxypropyl cellulose and (2) a compound selected from the group consisting of hydroxymethyl cellulose and hydroxyethyl cellulose. The compositions contain a major proportion of hydraulic cement or a mixture of hydraulic cement and sand.

It is a principal object of the present invention to provide water retentive agents for hydraulic cement which are lower in cost and produce an instantly usable thixotropic mortar which is effected to a lesser degree by temperature.

Other objects and advantages of the present invention will be apparent from the following description thereof.

DESCRIPTION OF THE PREFERRED EMBODIMENTS

Hydroxypropyl cellulose, hydroxymethyl cellulose, and hydroxyethyl cellulose in viscosities ranging from 4,000 to 40,000 cps. are used in this invention. Viscosity values given in this specification, refer to the viscosities of 2% by weight solutions in water at 25° C.

The amount of hydraulic cement in the mortar forming composition may be as high as 99.9% and the amount of the hydroxyalkyl cellulose blend from about 0.1 up to about 2.0% in the case of mortars containing sand and other constituents. Sand, if used, should be present in the amount of from one to three volumes of sand per volume of hydraulic cement. For setting porous tiles, a mixture containing equal volumes of hydraulic cement and sand up to one volume of hydraulic cement per 1½ volumes of sand produce a mortar which is entirely satisfactory.

The preferred dry mortar compositions contain finely divided inorganic fibers such as, for example, mineral wool, glass fibers, and the like in amount of from 1% to 2%. The incorporation of the inorganic fibers improves the thixotropic properties of the mortar, i.e., with the use of inorganic fibers to bond ceramic tile on a vertical wall, the tile will not tend to slip down the wall during the setting of the mortar.

The constituents are mixed dry in any suitable mixing equipment which will give a uniform and homogenous mixture, desirably at room temperatures. Usual additives may be incorporated in the mixture. For example, polyvinyl alcohol in small amount, usually about 0.1% to 2%, based on the weight of the hydraulic cement, can be added to increase adhesion and bond strength, reduce shrinkage, and attain better workability. Small amounts of perfume desirably carried on suitable inert carrier, with or without alcohol to disperse the perfume may be added for esthetic reasons.

Thus, the novel thin-set hydraulic cement dry mixtures of this invention consist of about 24% to 99.9% hydraulic cement; from 0.1% to 2.0% of the hydroxyalkyl cellulose blend; from 0 to 75% sand; from 0 to 2% inorganic fiber, and, if desired, small amounts of other conventional additives, for example, perfume, glycerine, polyvinyl alcohol, melamine resins, etc. The proportion of one of the hydroxyalkyl celluloses to the other will normally be in the range of 1:5 to 5:1.

The following examples are given to illustrate thin-set dry mixes embodying this invention. It is to be understood, however, that the invention is not limited to these examples.

Example 1

| | Percent |
|---|---|
| Hydroxypropyl cellulose, type HW viscosity at 2%, 30,000 cps. | .20 |
| Hydroxyethyl cellulose viscosity at 2%, 15,000 cps. | .40 |
| Hydraulic cement | 98.2 |
| Inorganic fiber | 1.2 |
| Total | 100 |

Example 2

| | Percent |
|---|---|
| Hydroxymethyl cellulose viscosity at 2%, 15,000 cps. | .20 |
| Hydroxypropyl cellulose viscosity at 2%, 30,000 cps. | .40 |
| Polyvinyl alcohol | 1.2 |
| Hydraulic cement | 48.0 |
| Sand | 50.0 |
| Inorganic fiber | .19 |
| Antifoam | .01 |
| Total | 100 |

Example 3

| | Percent |
|---|---|
| Hydroxypropyl cellulose, type HW viscosity at 2%, 30,000 cps. | .10 |
| Hydroxyethyl cellulose viscosity at 2%, 15,000 cps. | .50 |
| Hydraulic cement | 98.2 |
| Inorganic fiber | 1.2 |
| Total | 100 |

The above compositions of the present invention were compared with the following additional experimental compositions.

Example 4

| | Percent |
|---|---|
| Hydroxypropyl cellulose, type HW viscosity at 2%, 30,000 cps. | .60 |
| Hydraulic cement | 98.2 |
| Inorganic fiber | 1.2 |
| Total | 100 |

Experiment 5

| | Percent |
|---|---|
| Hydroxymethyl cellulose viscosity at 2%, 15,000 cps. | .60 |
| Hydraulic cement | 98.2 |
| Inorganic fiber | 1.2 |
| Total | 100 |

In the above examples and experiments, the constituents are mixed dry and the dry mixture is mixed with water in amounts to produce a mortar which will remain on a hawk (a plaster's tool). Approximately 1½ gallons of water are mixed with 25 pounds of the dry mixture. A high strength thin-set mortar results.

The mortars of this invention have the advantage, among others, over mortars heretofore known containing one type of cellulose in that the two types produce a thixotropic agent with increased solubility rate and reduced viscosity change with temperature.

The improved solubility rate is demonstrated by the following test for water retentivity. Water retentivity values were obtained on Portland containing various amounts of the thixotropic agents described hereinabove. The property was measured by placing a ⅛" layer of the mix previously slurried with the specified amount of water on the porous side of a quatered 4¼" x 4¼" commercial standard 181 glazed wall tile. A thin glass slide was placed over the mortar layer and the assembly positioned under the microscope lens. As the water left the mortar travelling onto the porous bisque of the tile, the mortar layer contracted thereby causing the slide to be displaced downward. This displacement could be accurately measured with a microscope and plotted against the square root of time. Normal procedure is to mix the mortar and let stand for 15 to 20 minutes to allow for solubility of the thixotropic agent. In these tests a premix of three minutes was used to demonstrate the increased solubility rate. The slope of the straight line divided into 1,000 yielded the retentivity values listed in Table 1.

TABLE 1

| Example: | Water requirement, percent | Retentivity |
|---|---|---|
| #1 | 28 | 35 |
| #2 | 28 | 30 |
| #3 | 28 | 28 |
| #4 | 28 | 20 |
| Experiment #5 | 28 | 5 |

The extremely poor water retentivity of Experiment #5 demonstrates the poor rate of solubility of methocel cement systems and the rate improvement derived with hydroxypropyl cellulose.

On-the-wall tests demonstrated the remarkable improvement obtained with hydroxypropyl cellulose and other hydroxyalkyl cellulose mixtures in cement mortar systems. Those systems not containing the hydroxypropyl cellulose cannot be used as dry set tile mortars immediately after mixing because of the slow solubility. Those containing the hydroxypropyl can be used immediately and have demonstrated viscosity stability over long periods of use because additional cellulose is not slowly being dissolved.

The advantage to be gained from using mixtures of hydroxypropyl cellulose and other alkyl cellulose when considering temperature variation with viscosity variation are again remarkable and result in a superior product. Newtonian materials change viscosity in an inverse relationship with temperature as a linear function when plotted on semi-log basis. Klucel (trade name for hydroxypropyl cellulose) Product Bulletin 800–4, 7/71, 4713414 on page 11 indicates "that unexpected viscosity effects have been noted when Klucel is combined with nonionic polymer and anionic polymers in water solution. With Natrosol (trade name for hydroxyethyl cellulose), the viscosity is less than expected." Checking the viscosity change of alkyl cellulose and hydroxypropyl cellulose mixtures with temperature produces less change than experienced individually as indicated by the following results:

TABLE 2

| | Viscosity Centipoise at 25° C. |
|---|---|
| Natrosol 250 H, 1% Sol. | 2,000 |
| Klucel HW, 1% Sol. | 2,000 |
| Natrosol 250 H, 1.0% of Sol. and Klucel HW, 1.0% of Sol. | 3,450 |

| | Viscosity Centipoise at 35° C. |
|---|---|
| Natrosol 250 H, 1% Sol. | 1,550 |
| Klucel HW, 1% Sol. | 1,600 |
| Natrosol 250 H, 1.0% of Sol. and Klucel HW, 1.0% of Sol. | 3,260 |

This data was confirmed by tests with the mortar where the effect of viscosity change with temperature is magnified because of the high filler cement loading of the mortar. Mortar samples based on the combined thixotropic materials are clearly easier to trowel over the range of temperature experienced in typical field installations from a single dry mix relative to single component alkyl cellulose materials modified cement systems.

Since changes in the dry mixes of this invention can be made without departing from the scope of this invention, it is intended that all matter contained in the above description shall be interpreted as illustrative and not in a limiting sense.

What is claimed is:

1. A dry mortar-forming composition comprising from 24 to 99.9% hydraulic cement and from .10 to 2% of a mixture of (1) hydroxypropyl cellulose and (2) a compound selected from the group consisting of hydroxymethyl cellulose and hydroxyethyl cellulose.

2. The invention as defined by claim 1 wherein the composition includes hydroxymethyl cellulose.

3. The invention as defined by claim 1 wherein the composition includes hydroxyethyl cellulose.

4. A dry mortar-forming composition comprising hydraulic cement, sand and from .1 to 2% of a mixture of (1) hydroxypropyl cellulose and (2) a compound selected from the group consisting of hydroxymethyl cellulose and hydroxyethyl cellulose.

5. The invention as defined by claim 4 wherein the hydraulic cement comprises from 24 to 99.9% of said composition and the amount of sand is in the range of about one to three volumes of sand per volume of hydraulic cement.

6. The invention as defined by claim 4 wherein the composition includes hydroxymethyl cellulose.

7. The invention as defined by claim 4 wherein the composition includes hydroxyethyl cellulose.

8. A dry mortar-forming composition consisting of 24 to 99.9% hydraulic cement;
0.1 to 2.0% of a mixture of hydroxypropyl cellulose and either hydroxymethyl cellulose or hydroxyethyl cellulose;
0 to 75% sand;
0 to 2% inorganic fiber;
0 to 2% polyvinyl alcohol; and
0% to small amounts of additives selected from perfume, glycerine, melamine resins and antifoam.

References Cited

UNITED STATES PATENTS

| | | | |
|---|---|---|---|
| 2,580,565 | 1/1952 | Ludwig | 106—93 |
| 3,090,693 | 5/1963 | Kelly et al. | 106—93 |
| 3,243,307 | 3/1966 | Selden | 106—99 |

FOREIGN PATENTS

| | | | |
|---|---|---|---|
| 1,020,525 | 2/1964 | Great Britain | 106—93 |
| 1,145,239 | 3/1966 | Great Britain | 106—93 |

DELBERT E. GANTZ, Primary Examiner

J. W. HELLWEGE, Assistant Examiner